United States Patent [19]

Peters

[11] Patent Number: 5,438,918

[45] Date of Patent: Aug. 8, 1995

[54] APPARATUS FOR SEPARATING FOOD CONTENTS

[75] Inventor: Thomas J. Peters, Denver, Colo.

[73] Assignee: SSDE Technologies Corporation, Colo.

[21] Appl. No.: 77,123

[22] Filed: Jun. 14, 1993

Related U.S. Application Data

[62] Division of Ser. No. 790,368, Nov. 12, 1991, Pat. No. 5,230,917.

[51] Int. Cl.⁶ .......................... A23P 1/00; B03C 1/00
[52] U.S. Cl. ........................ 99/483; 99/353; 99/484; 99/516; 99/536; 99/537
[58] Field of Search ................ 99/353, 355, 483, 484, 99/516, 536, 537, 509, 510; 100/902; 209/3.1, 215, 228, 636; 241/19, 20, 14, 24, 61, 77, 79.1, 81, DIG. 38, 194, 284; 426/478, 479, 506, 516, 635

[56] References Cited

U.S. PATENT DOCUMENTS

| | | | |
|---|---|---|---|
| 2,905,557 | 9/1959 | Degenhardt | 426/636 |
| 3,653,871 | 4/1972 | Tempe | 71/8 |
| 3,736,120 | 5/1973 | Tempe | 241/DIG. 38 |
| 3,930,799 | 1/1976 | Eweson | 241/194 |
| 3,971,306 | 7/1976 | Wiese et al. | 99/484 |
| 4,284,514 | 8/1981 | Wright | 210/721 |
| 4,702,929 | 10/1987 | Lehn et al. | 426/635 |
| 4,779,634 | 10/1988 | Gutierrez et al. | 99/536 |
| 4,967,912 | 11/1990 | Schonberg | 209/215 |
| 4,988,044 | 1/1991 | Weitzman et al. | 241/14 |
| 5,363,754 | 11/1994 | Coles et al. | 99/484 |

*Primary Examiner*—Timothy F. Simone
*Attorney, Agent, or Firm*—John E. Reilly

[57] ABSTRACT

Food contents are separated from ferrous metal cans for conversion into useful byproducts by lacerating the can bodies into strips of metal to expose their contents, advancing along a vibrating conveyor section through a liquid spray, followed by magnetic separation to remove the metal strips and separately collect the food contents and metal strips for recycling. In order to convert the food contents into animal feed, the contents are first dried to reduce their moisture level either by mechanical dehydration or by the addition of bulking agents and then advanced through an extruder section to convert the food contents into dry particle form.

16 Claims, 2 Drawing Sheets

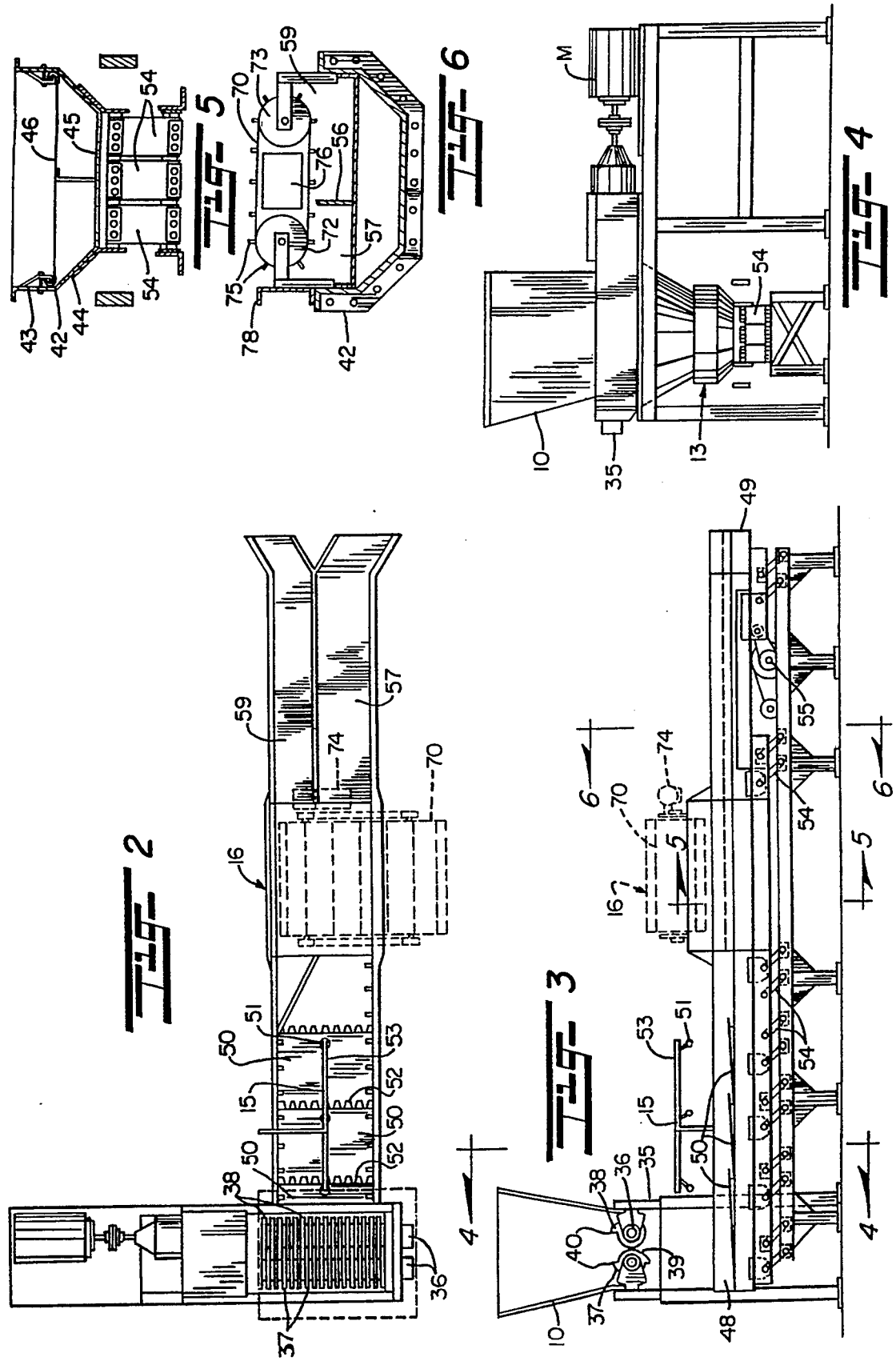

APPARATUS FOR SEPARATING FOOD CONTENTS

CROSS-REFERENCE TO RELATED APPLICATIONS

This application is a divisional application of Ser. No. 790,368, filed 12 Nov., 1991, U.S. Pat. No. 5,230,917 for METHOD AND APPARATUS FOR SEPARATION OF CANNED GOODS AND RECLAIMING USEFUL FOOD VALUES THEREFROM, invented by Thomas J. Peters.

This invention relates to the recycling of packaged goods, such as, canned food; and more particularly relates to a novel and improved method and apparatus for the recovery of useful food or feed values from canned goods.

BACKGROUND AND FIELD OF THE INVENTION

The accumulation of waste is becoming an increasingly serious problem not only in the United States of America but in a number of foreign countries as well. A major contributor to this problem is the accumulation of canned goods, particularly canned food products, and the continuing increase in storage space required for the disposal of such waste products and the preventive measures necessary to avoid contamination of the earth and ground water when exposed to such waste products, and particularly owing to the toxicity of food contents after deteriorating over extended periods of time.

It has been proposed to recycle refuse into fertilizer by various methods, such as, disclosed in U.S. Pat. Nos. 3,653,871 and 3,736,120 to A. Tempe. Also, it has been proposed to subject cans to a shredding process primarily for the purpose of separation of paper labels from the cans as proposed in U.S. Pat. No. 4,988,044 to D. H. Weitzman et al. U.S. Pat. No. 4,284,514 to D. R. Wright is similarly directed to a method of rupturing containers for the purpose of treating the material inside the container but does not suggest a satisfactory way of separating the material inside of the container from the metal so that it can be recycled or converted into useful feed values. Moreover, it has been proposed to recycle materials, such as, hide waste materials combined with starch through the combined steps of dehydration and extrusion, for example, as suggested in U.S. Pat. No. 4,702,929 to C. J. Lehn et al. Other patents of interest in this area are U.S. Pat. Nos. 2,905,557 to J. Degenhardt, 3,930,799 to E. W. Eweson and 3,971,306 to F. D. Wiese et al. To my knowledge, however, no one has satisfactorily devised a process and apparatus for lacerating canned goods or other containers to remove the contents for conversion into useful byproducts and particularly in such a way that the process can be carried out in a high speed, closely coordinated sequence of steps.

SUMMARY OF THE INVENTION

It is therefore an object of the present invention to provide for a novel and improved method and apparatus for the conversion of waste materials into useful end products.

It is another object of the present invention to provide for a novel and improved method and means for the efficient separation of containers from their food contents and the conversion of the container and contents into useful end products in an economical and dependable manner.

A further object of the present invention is to provide for a novel and improved method and apparatus for the laceration and separation of containers into metal segments or strips and the efficient removal of such metal segments from the contents, followed by the conversion of the contents into useful food values including but not limited to animal feed.

It is a still further object of the present invention to provide for an efficient system for the separation of food wastes from metal containers and conversion of same into animal feed and in such a way as to sterilize the contents and minimize the amount of bulk or nutrients to be introduced into the waste material in the process of conversion over to animal feed.

An additional object of the present invention is to provide for a method of converting waste food in containers, such as, plastic or glass bottles and cans into useful end products in a closely coordinated sequence of steps of lacerating the containers to expose the contents, separating the containers from the contents, dehydrating the contents to remove on the order of 70% to 75% of the moisture content, introducing bulking agents to the food product, and extruding the mixture of food products and bulking agents whereby to convert to dry particle form.

In accordance with the present invention, a method has been devised for separating and treating waste canned food products wherein food contents are contained within ferrous metal containers and which comprises the steps of directing a plurality of the cans through a metal lacerating stage to cut the cans into strips or segments of metal, spraying the metal strips and contents to encourage initial separation of the food contents from the metal strips and simultaneously vibrating the strips and contents to encourage further initial separation therebetween, magnetically separating the ferrous metal strips from the food contents and directing the metal strips and contents along separate paths of travel; and further, drying the food contents to reduce the moisture content therein as a preliminary to advancement through an extruder in which the contents are extruded in an oxygen-free atmosphere and at an elevated temperature sufficient to sterilize the food contents. As recited, the method of the present invention is particularly adaptable for use in separating ferrous metal containers from their food contents so that the food contents can be converted into useful food values. More broadly, however, the method of the present invention would be useful also in the recovery of food products or contents from other types of containers, such as, glass, plastic or non-ferrous metals and in which event the preliminary separation between the containers and food contents would be carried out by means other than magnetic separation. For example, glass containers could be pulverized or otherwise fragmented and otherwise mechanically separated from the food contents including the combined steps of vibrating and spraying the container fragments and food contents as a preliminary to mechanical separation.

Once separated, it is important that the food contents be dehydrated to reduce the moisture level to well under 50% and preferably to a level approximating 25% as a preliminary to extruding. Depending upon the desired end use of the food contents, bulking agents may be introduced into the food contents before and after dehydration and intimately mixed with the food contents preliminary to extrusion. In the extrusion stage, the food contents including any bulking agents are mixed in an oxygen-free atmosphere and at an elevated temperature sufficient to sterilize the contents, following which the extruded product is crumbled into particle form and delivered for packaging.

In the preferred form of apparatus for separating the food contents from ferrous metal cans, the cans are advanced through a metal shredder which is provided with a series of counter-rotating knives to lacerate the can bodies into segments or strips, liquid spray means are provided for spraying the metal strips and food contents to encourage initial separation of the contents from the strips, following which the metal strips and food contents are advanced through a magnetic separator for separating the metal strips from the food contents. Most desirably, a vibrating conveyor system is provided to advance the metal strips and food contents from the output of the metal lacerator through the spray means and magnetic separating means to further encourage separation of the food contents from the metal strips as well as to remove the food contents along a separate path of travel from that of the metal strips at the outlet of the magnetic separating means; and the conveying means includes vibrating ramps to cause the metal strips and food contents to be tumbled through the spraying means together with a screen which will permit removal of much of the liquid from the food contents preliminary to advancing through the magnetic separating means.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 2 is a top plan view of a preferred form of separating system employed in accordance with the present invention;

FIG. 3 is a front view in elevation of the system shown in FIG. 2;

FIG. 4 is an end view of the entrance end of the separating system shown in FIGS. 2 and 3;

FIG. 5 is a cross-sectional view taken about lines 5—5 of FIG. 3;

FIG. 6 is a cross-sectional view taken about lines 6—6 of FIG. 3; and

DETAILED DESCRIPTION OF PREFERRED EMBODIMENT

Figure 1:
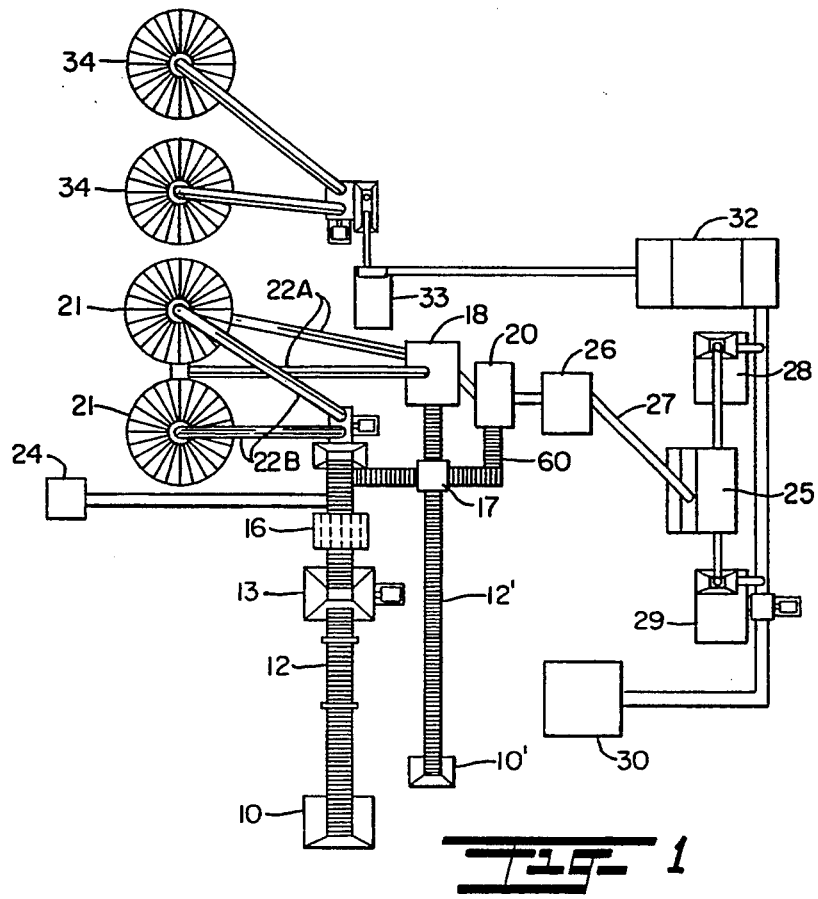
FIG. 1 is a schematic illustration of a preferred form of apparatus in accordance with the present invention.

Referring in more detail to the drawings, there is schematically illustrated in FIG. 1 a process and apparatus for reclaiming canned food which has gone bad and otherwise presents a problem of waste collection. For the purpose of illustration but not limitation, the preferred form of invention will be described in connection with the conversion of the food contents from ferrous metal containers into animal feed wherein the canned goods are advanced from a loading hopper 10 along a conveyor 12 into a low speed, high torque shredder section 13 in which the cans are lacerated into strips of metal so as to expose their contents. The metal strips and food are continuously advanced along the conveyor from the shredder 13 beneath an overhead water spray section 15 into a magnetic separator 16, the foodstuff and liquids being completely separated from the metal by a combination of vibration, water pressure and magnetic separation. The metal strips are separately recovered in a storage area designated 24 for subsequent recycling. The food and water are independently recovered and the food advanced through a grinder stage 17 and then to a mixer stage 18 for mixing a bulking agent with the food contents. Here the bulking agent is delivered from bulk storage tanks 21 through delivery lines 22A into the mixer stage 18 to form a homogenous mass with the food contents. If a bulking agent is not required, the food contents may be delivered directly from the grinder stage 17 into a dehydrator 20 wherein the moisture content in the food is reduced to approximately 25% moisture content. As a further alternative, when the system is not in use for separating metal cans from their contents, the conveyor section 12 can be utilized to deliver bulking agents through supply lines 22B into the bulk storage bins 21.

From the dehydrator stage 20, the food contents along with any bulking agent are directed into a common surge bin or hopper 26, and a line 27 communicates with extruders 28, 29 at opposite ends of a bin 25; an optional extruder 30 is similarly connected to the bin 25, as shown, depending upon the volume of foodstuffs being handled. In a manner to be described, each extruder is operative to cook the food mixture in an oxygen-free atmosphere under the combined application of heat and pressure so as to have very little effect on the vitamin content of the food as it sterilizes the food. The system can also be used for the treatment of food materials which do not require separation from their containers and, to this end, a separator hopper 10' is provided at the leading end of a second conveyor section 12' which advances directly into the grinder stage 17 for subsequent advancement either into the mixer stage 18 or dehydrator 20 as described.

The condition of the food mixture as it exits the extruder stage is typically a congealed but hardened mass and it is therefore desirable to tumble and cool the mass in a cooling stage 32 as a preliminary to advancement through a hammer mill 33 where it is reduced to small dried particle form to facilitate further packaging and handling. The resultant particles then are advanced into bulk storage area 34.

Referring more specifically to FIGS. 2 to 6, the hopper 10 converges downwardly into a low speed, high torque shredder section 13 which includes a generally rectangular open housing 35 for a pair of spaced, parallel, counter-rotating shafts 36 to which are keyed for rotation a series of knife disks 37 and 38. Each disk 37 and 38 has opposed flat surfaces and an outer peripheral surface 39 upon which are formed one or more tangentially directed knife edges 40 at circumferentially spaced intervals. In the preferred form, there are a series of six knife edges 40 at equally spaced circumferential intervals around the disk 37, and a series of five equally spaced knife edges 40 are disposed around each disk 38. Each of the knife edges 40 effectively forms a sharp-edged shoulder on the peripheral edge 39, the shoulder extending parallel to the axis of rotation of the disks. The disks 37 and 38 are counter-rotated by the shafts 36 and motor drive M to draw the cans downwardly and between the knife disks 37 and 38 in such a way that the cans are lacerated into segments or strips, as opposed to being crushed, in order to better rip open the contents and expose them. Another important factor is to regulate the width and spacing of the knife disks 37 and 38 for most effective laceration of the can bodies so that, for example, the knife disks are given a width of ¾" for a standard can body and the spacing or gap between adjacent disks 37 and 38 is 0.0001"; also, there are more disks 37 than the total number of disks 38 as shown. A preferred form of shredder is the Model 1000E, manufactured and sold by Shredding Systems, Inc. of Wilsonville, Oreg. but modified to incorporate the knife configuration, width and spacing as described.

The cans are lacerated into strips of metal to expose the contents as they are advanced onto a tilted oscillatory conveyor 12, such as, the Model LS, manufactured and sold by Vibra-Pro Company, Inc. of Boise, Id. As best seen from FIGS. 5 and 6, the conveyor 12 is made up of an elongated trough 42 in the form of a generally U-shaped channel having upper spaced parallel vertical sides 43 which verge into downwardly inclined lower sidewalls 44 and a flat horizontal bottom portion 45. A horizontal screen 46 is positioned at the intersection of the vertical sides 43 and the lower sidewalls 44 and the screen 46 is inclined at a low, gradual upward angle of about 1.5° from the entrance end 48 to the exit end 49. The conveyor 12 is modified to incorporate a series of ramps 50 which are disposed near the entrance end 48 to extend upwardly at a slightly greater angle than the screen 46, each ramp is defined by a screen provided with flexible claws or ribs 52 at its upper end and which ribs 52 are disposed in slightly overlapping relation to each next successive ramp 50. Preferably, a series of three ramps 50 are located beneath a high pressure water spray section 15, the section 15 consisting of a series of three jets 51 along a common water pipe 53 which is located directly above the ramp 50. The entire trough section is mounted on spring-loaded stabilizer arms 54 which are operated by an eccentric drive 55 toward the discharge end of the conveyor to impart an oscillatory motion to the trough and ramps causing the metal chunks and exposed contents to be advanced upwardly along the ramps and across the water spray section 15 so as to encourage further separation of the contents from the lacerated can strips.

The liquid and smaller food particles are free to pass by gravity through the screen 46 into the bottom 46 of the trough 42 and advance along a separate course for discharge into separate collection areas to be described. The larger solid particles including the can fragments or strips are advanced from the ramp section 50 into a magnetic separator section 16 which, as noted, is disposed perpendicular to the path of travel of the material along the conveyor. One suitable form of magnetic separator is the Model 100 Stearns, manufactured by Stearns Manufacturing of Cudahy, Wisconsin. In the preferred form, the section 16 comprises a flexible belt 70 composed of a rubber or rubber-like material which is trained over a pair of non-magnetic drums 72 and 73, the drums being synchronously rotated by a common motor drive 74. A series of cogs or paddles 75 are arranged at equally spaced intervals around the external surface of the belt 70, each extending in a direction transverse to the direction of travel of the belt 70. The entrance to the magnetic separator section includes a vertical guide wall 56 which causes the material to converge into a narrow trough section, designated at 57, and to advance directly through the separator section 16. A permanent magnet 76 is situated between the drums 72 and 73 whose magnetic attraction is sufficient to draw the metal segments upwardly from the trough section 57 into the path of the moving paddles 75 so as to be diverted by the paddles over the guide wall 56 and, as the metal segments move away from the field of attraction of the magnet, fall by gravity into the channel 59. A stiffener board 78 at the far side of the drum 72 is disposed in the path of the paddles 75 to prevent any of the metal segments from being thrown out of the trough area. It will be noted that the channels 57 and 59 are vibrated, also, by the motor drive 55 and arms 54 to advance the materials away from the separator section 16 with the metal strips and segments passing into a collection area 24 for recycling. The liquid collected can be recycled or returned by pumping back to the water spray section 15. Water can also be filtered through the use of Zone Tronic machinery manufacatured by Johnson Systems of Aurora, Ill. and returned to the sewer.

Figure 7:
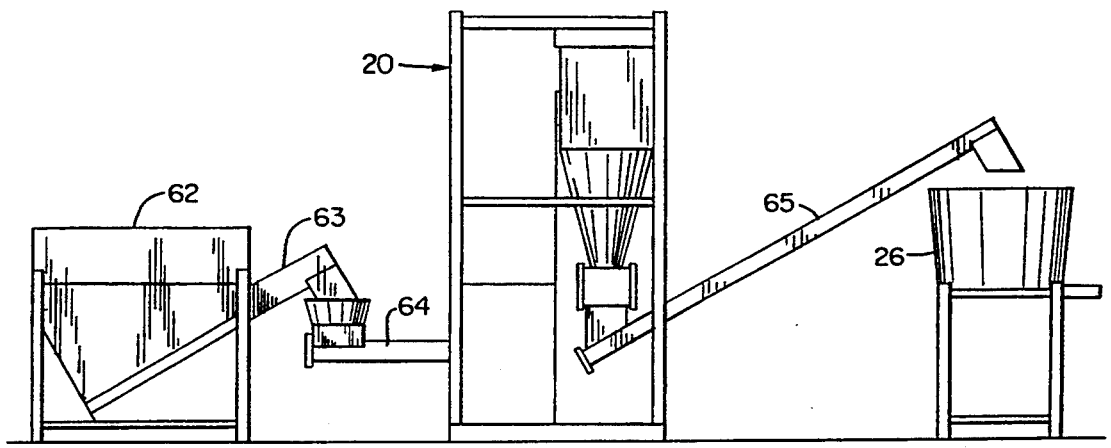
FIG. 7 is a front view in elevation of the dehydrator stage of the apparatus in accordance with the present invention.

The food contents from the trough 57 are directed along a conveyor extension 60 into the grinder stage 17 and from which the contents are advanced either through the mixer stage 18 or the dehydrator stage 20 as shown in FIGS. 1 and 7. The bulking agents are typically selected from shredded cardboard, corn, soybean and paper. Other food products may be employed as bulking agents, such as, wheat, oats, hops, brans, barley and other bulk fiber materials, and the conveyor section 12 forms a convenient means of delivering and loading the bulking agents via the lines 22B into the bulk storage bins 21. A number of these bulking agents will act as dehydrating agents but in general would have to be introduced at an extremely high ratio of bulking agent to food contents in order to replace the dehydrator stage 20.

Suitable forms of dehydrators 20 are the KIX dehydrator Model No. K3 manufactured and sold by AKT of Nambour, Australia, and the ZIWEX Dehydrator, Model No. 2000, manufactured and sold by Ziweg Ag. of Oberenfelden, Switzerland and wherein the food which typically consists of animal and vegetable by-products is preheated, advanced through a press to encourage reduction of the fat content, then enters an agitator through which air is blown at a high temperature to cause evaporation of the water and to break down the byproducts into small particles. A drying tower is provided along with a classifier to return over-sized particles to the agitator. A cyclone is provided to separate the solid particles from the air and then to advance into a rotary screen for transfer into the surge bin or hopper 26. The process and apparatus of the present invention as applied to ferrous metal containers has been found capable of achieving substantially complete separation of the food contents from their containers. In this relation, it will be apparent that the metal segments or strips recovered in the collection area 24 may be cycled through the shredder 13, water spray 15 and separator 16 one or more times to achieve the most complete removal of the food contents from the metal segments. Most importantly, however, the separator section 16 will bring about substantially complete separation of the metal from the food contents on the initial paths so as not to require further conditioning or treatment of the food contents prior to being advanced into the extruder and final packaging stages. Again, the metal strips can be separately recovered and compacted for recycling purposes.

The surge bin 26 serves to store the material as a preliminary to further treatment. For example, in converting the food into useful feed values, it is advanced to the bin 25 for distribution through one or more of the extruders 28–30. A preferred form of extruder is the Model 2500 manufactured and sold by Insta-Pro International, Ltd. of Des Moines, Iowa and which basically comprises a wet and dry extrusion process in which the material is passed through a barrel having increasing restrictions and in which friction acts as the sole source of heat to effectively cook the material in an oxygen-free atmosphere. For example, temperatures of 250° F. to 300° F. are sufficient to cook the food product without producing off-odors or oxidation. The combined heat and pressure operates to destroy the bacteria, mold and yeast which exist on almost all plant material and which otherwise would be very harmful to the material. Any enzymes are inactivated, stabilizing the product against destruction of its nutritional properties. Rapid pressure change upon release from the extruder into the atmosphere will cause explosion of the starch and oil cells, resulting in expansion, shaping and texturizing of the product together with a 70% to 75% loss in moisture. With a 30-second processing time and an oxygen-free atmosphere, there is very little effect on the protein, energy, vitamin content or coloring of the product. Extremely important to the dry extrusion process is the close control over the moisture content of the food products and any bulking agent delivered from the separator section. Thus, it is highly desirable to reduce the moisture in the food products passing through the dehydrator stage 20 to a moisture level on the order of 25%.

It will be evident from the foregoing that the laceration and separation stages of the process have useful applications other than in direct combination with the dehydrator and extrusion stages as described. Still further, the system would have useful application to separation of the contents from containers other than metal cans, for example, glass, plastic, non-ferrous metal containers by appropriate modification of the lacerating and separation stages. Referring to FIGS. 1 and 7, most desirably a surge bin 62 forms a part of the conveyor extension 60 in order to store the food contents and regulate the rate of advancement of the food contents via a suitable elevator 63 into in-feed screw 64 leading to the dehydrator stage 20. Similarly, another elevator 65 will advance the particles into the surge bin 26.

It is therefore to be understood that while a preferred method and apparatus of the present invention has been herein set forth and described, various modifications and changes may be made without departing from the spirit and scope of the present invention as defined by the appended claims and reasonable equivalents thereof.

I claim:

1. Apparatus for separating the food contents from containers, comprising:
   means for lacerating said containers to expose the food contents therein;
   spraying means for spraying said containers and food contents to encourage initial separation of said contents from said containers;
   separating means for mechanically separating said contents from said containers; and
   means for drying said contents to reduce the percentage moisture level therein.

2. Apparatus according to claim 1, including means for extruding said food contents in an oxygen-free atmosphere and at an elevated temperature sufficient to sterilize said food contents.

3. Apparatus according to claim 1, said lacerating means being operative to lacerate said containers into segments, and vibrating means for vibrating said container segments and food contents to encourage further separation therebetween.

4. Apparatus according to claim 1, including conveyor means for successively advancing said containers and food contents from said lacerating means through said spraying means and said separating means, said vibrating means being drivingly connected to said conveyor means to vibrate said conveyor means as said containers and food contents are advanced therealong.

5. Apparatus according to claim 4, said conveyor means including a series of ramps for advancing said containers and food contents through said spraying means.

6. Apparatus according to claim 5, said ramps defined by inclined platforms having flexible fingers along upper edges thereof.

7. Apparatus according to claim 1, said separating means defined by a magnetic separator for removing ferrous metal segments from said food contents.

8. Apparatus according to claim 4, said conveyor means extending along an upwardly inclined path of travel from said lacerating means through said separating means.

9. Apparatus for separating and treating waste canned food products wherein food contents are contained within ferrous metal containers comprising:
   can body shredding means including an upper delivery section and a series of counter-rotating knife members located beneath said delivery section;
   means for directing a plurality of said metal cans containing food contents into said delivery section for advancement through said counter-rotating knife members;
   conveyor means beneath said counter-rotating knife members for advancing said lacerated metal can segments and exposed food contents away from said can body shredding means;
   water spray means disposed in overhead relation to said conveyor means downstream of said can body shredding means for spraying said can body segments and food contents to encourage initial separation of said food contents from said metal strips;
   magnetic separator means disposed in overhead relation to said conveyor means downstream of said water spray means for separating said metal strips from said food contents and for directing said metal strips and food contents along separate paths of travel from one another; and
   means for collecting said food contents and converting same into useful feed values.

10. Apparatus according to claim 9, said can body shredding means including a pair of horizontally spaced parallel counter-rotating shafts, said knife members fixed for rotation on said counter-rotating shafts, each of said knife members being in the form of a disk having knife edges on its outer peripheral surface, said disks on one of said counter-rotating shafts disposed in staggered relation to said disks on the other of said counter-rotating shafts.

11. Apparatus according to claim 10, said disks on said one of said counter-rotating shafts having knife edges in diametrically opposed relation to one another and each of said disks on said other of said counter-rotating shafts having a single knife edge on its peripheral surface.

12. Apparatus according to claim 11, each of said disks being on the order of ¾" in width and with special cutters.

13. Apparatus according to claim 9, including vibrating means associated with said conveyor means for vibrating and advancing said can body strips and food contents from said can body shredding means through said magnetic separating means.

14. Apparatus according to claim 13, said conveying means being in the form of a trough having a screen member therein for supporting said metal strips and food contents for advancement therealong and means at the bottom of said trough for collecting any liquid and food particles passing through said screen.

15. Apparatus according to claim 9, said converting means including drying means for reducing the moisture level in said food contents recovered, and extruding means for extruding said dried food contents in an oxygen-free atmosphere and at an elevated temperature sufficient to sterilize said food contents.

16. Apparatus according to claim 5, including means for introducing a bulking agent into said food contents after separating said food contents from said metal strips, and means for blending said bulking agent and said food contents into a homogenous mass preliminary to advancement through said extruding means.

* * * * *